J. E. HALLOCK.
WEIGHING MACHINE.
APPLICATION FILED FEB. 27, 1919.
1,366,449.
Patented Jan. 25, 1921.
3 SHEETS—SHEET 2.
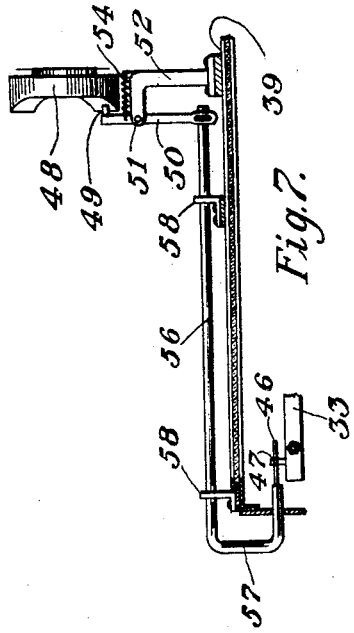
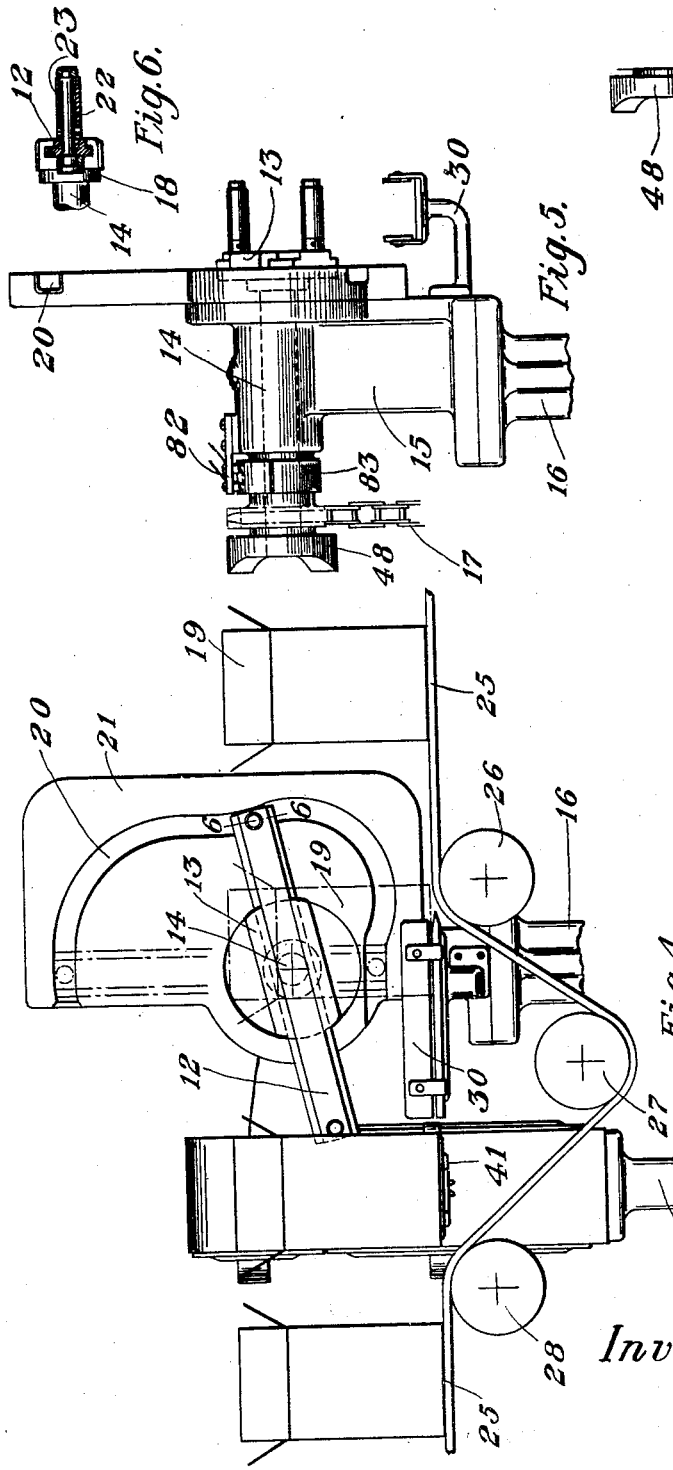
Inventor
J. Elmer Hallock
by his attorney
Archibald Cox.

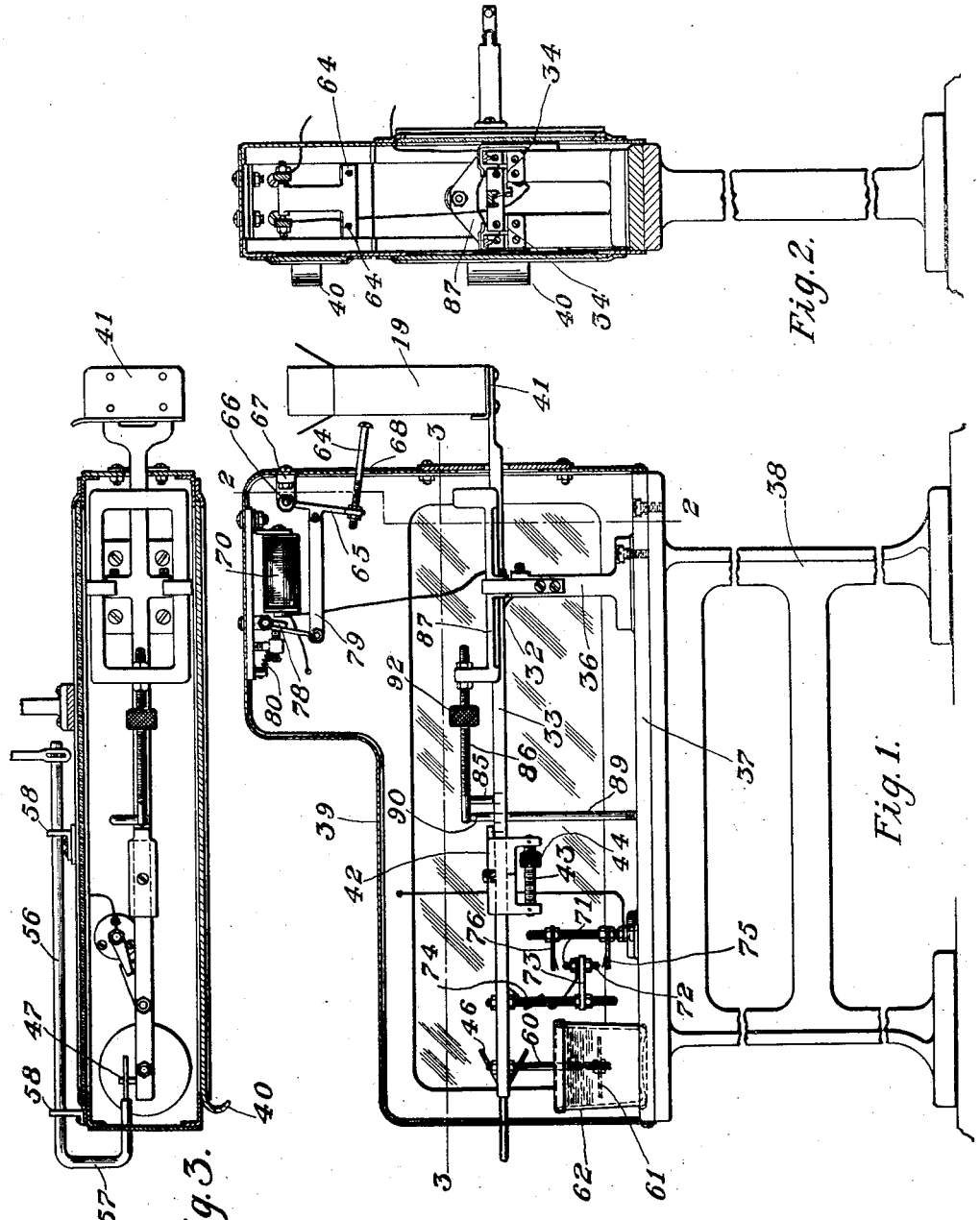

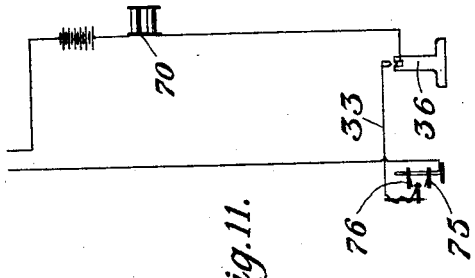
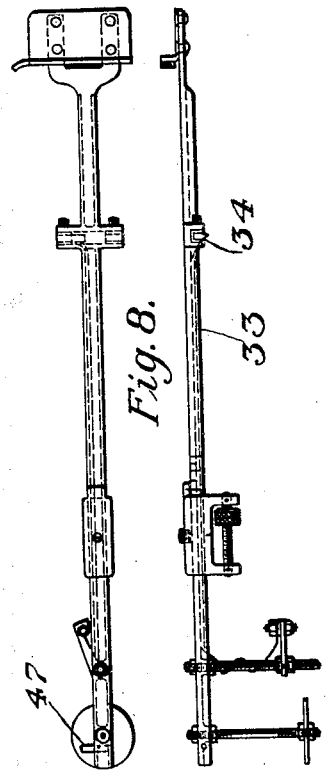
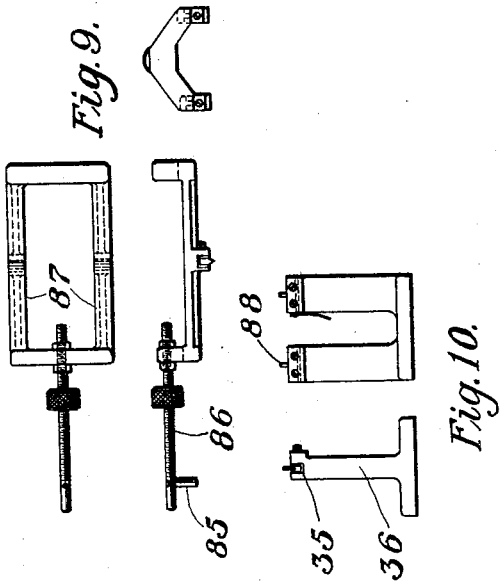

UNITED STATES PATENT OFFICE.

JAMES ELMER HALLOCK, OF SWAMPSCOTT, MASSACHUSETTS, ASSIGNOR OF ONE-HALF TO LEVER BROTHERS COMPANY, OF CAMBRIDGE, MASSACHUSETTS.

WEIGHING-MACHINE.

1,366,449.     Specification of Letters Patent.     Patented Jan. 25, 1921.

Application filed February 27, 1919. Serial No. 279,557.

*To all whom it may concern:*

Be it known that I, JAMES ELMER HALLOCK, a citizen of the United States, and a resident of Swampscott, in the county of Essex and State of Massachusetts, have invented certain new and useful Improvements in Weighing-Machines, of which the following is a specification.

The present invention relates to an improvement in weighing machines.

It is common practice to automatically fill and seal packages with such goods as foods, soap powders and the like commodities. It has been found, in the process of automatically weighing out the commodities and filling them in the packages, that sometimes the packages are under-filled and at other times over-filled. These discrepancies in the weight of the contents of the packages depend more or less upon the conditions of operation and the nature of the goods handled by the automatic weighing and filling mechanism. Where the article handled gives rise to considerable dust, the latter, by clogging the more or less delicate weighing and filling mechanism, prevents the accurate operation thereof. Occasionally the mouth of the hopper of the filling machine becomes choked, with the result that for a space of time, until the difficulty is remedied, the packages are either under or over-filled. The possibility that some packages may go out into the market with less than their standard or guaranteed weight of contents in them, or with considerably more than the consumer pays for, has caused manufacturers and producers to frequently check up the automatic filling and weighing mechanism in order to prevent discrepancies and thereby insure uniformity in the weight of the packages. This practice has been found more or less unsatisfactory. It has been found inexpedient, however, to depend solely on the accuracy of the automatic filling and weighing machine, because if under-weight packages are permitted to go to the consumer, the good-will or reputation of the business of the producer or manufacturer is thereby liable to be jeopardized to the extent of the loss of considerable trade. To obviate this contingency, many producers or manufacturers of automatically filled packages have the automatic filling and weighing mechanism so regulated that the packages will be slightly over-weight when put out on the market. This, however, does not entirely satisfactorily remedy the difficulty, because although the chances of putting out under-weight packages is thereby lessened, there is, on the other hand, the ever present chance of putting out packages considerably over weight, to the loss of the manufacturer. It has, accordingly, been proposed heretofore to provide supplementary weighing machines to receive the filled packages as they pass from the filling machine to the sealing machine for the purpose of re-weighing them. These supplementary weighing machines have been so constructed that if the packages are under weight or more than a certain amount over weight, the packages will be ejected from the machine or displaced from their position in the succession of packages passing from the weighing machine to the sealing machine.

The object of the present invention is to improve upon and simplify the construction of these supplementary weighing machines, in order that the operation of weighing the packages as they come from the filling machine may be more expeditiously and accurately performed than is possible with the supplementary weighing machines as heretofore constructed. To the accomplishment of this object, the improved weighing machine of the present invention is provided with two scales, which are so correlated in their operations that one scale only is used to determine the weight of such packages whose contents are under standard weight or are of standard weight, whereas the two scales act in conjunction in determining the weight of such packages whose contents are over standard weight. These scales so control the operation of the ejecting mechanism that under-weight packages are ejected from the machine and packages which are more than a predetermined amount over weight are also ejected from the machine.

It will be understood that the weighing machine of the present invention is adapted to weigh packaged goods of any description whatever, whether they be foods, soap powders, or other articles automatically packaged and weighed, and whether the package or container is a paper carton, a bottle, a cartridge, a tin can, or any like container in which the packaged goods are sold in the market. For the sake of convenience, the word "package" will hereinafter be used as a generic term for designating any kind of receptacle in which the commodity is automatically placed, weighed and sealed.

The preferred form of the invention is illustrated in the accompanying drawings, in which Figure 1 is a side elevation of the improved weighing machine; Fig. 2 is a vertical section taken on the line 2—2 of Fig. 1; Fig. 3 is a longitudinal section taken on the line 3—3 of Fig. 1; Fig. 4 is a front elevation of the mechanism for automatically placing the packages on the pan of the main scale of the weighing machine; Fig. 5 is an end elevation of the package-feeding means shown in Fig. 4; Fig. 6 is a section taken on the line 6—6 of Fig. 4; Fig. 7 is a top plan of the device for holding the beam of the main scale in neutral position while one package is being removed and another placed on the scale-pan; Fig. 8 is a top plan and a side elevation of the beam of the main scale and parts connected therewith; Fig. 9 is a top plan, side elevation and a front elevation of the secondary or auxiliary scale; Fig. 10 is an end and a front elevation of the fulcrum for the main and auxiliary scales; and Fig. 11 is a diagrammatic view of the electrical connections between the weighing mechanism and the ejecting mechanism.

The improved weighing machine as illustrated in the accompanying drawings comprises a weighing mechanism for receiving the packages from the filling machine and weighing them to determine whether they are under weight or sufficiently over weight to be displaced from their position in the regular succession of packages passing from the filling machine to the sealing machine; an ejecting mechanism controlled by the weighing mechanism for ejecting the underweight packages and the packages sufficiently over weight from the machine, that is, from their places in the line of packages; and subsidiary to the operation of the weighing and ejecting mechanisms is a feeding device which operates to advance the packages, step by step, onto the pan of the main scale into correct position to be weighed. For convenience, the feeding device will be described first:—

The feeding device is illustrated in Figs. 4 and 5 and comprises a feed arm 12 slidingly received in a guide or slide way 13 mounted on one end of a cam shaft 14 journaled in a bearing 15 fixed on the top of a standard 16. The shaft 14 is driven from a suitable source of power by a chain 17, which passes over a sprocket wheel fixed on the shaft. The feed arm 12 is provided with two cam pins 18 (Fig. 6), one at each end of the arm, which are adapted to enter and travel in a cam groove 20 formed in the face of a plate 21 fixed to and rising from the shaft journal bearing 15. The elongated ends 22 (Fig. 6) of the cam pins 18 form bearing surfaces for rolls 23, which serve as fingers to engage and push the packages 19 into correct position on the pan of the main scale. As clearly shown in Fig. 4, the packages are successively brought by a conveyer belt 25 (which passes respectively over, under and over the rolls 26, 27 and 28) onto one end of a receiving platform 30 secured to the journal 15 below the package-feeding device. The position in which the conveyer belt 25 leaves the package on the receiving platform 30 is shown in dot and dash lines in Fig. 4. The package is now in position to be engaged by one of the fingers on the feed arm 12 and moved into correct position on the pan of the main scale of the weighing mechanism. The path of the cam groove 20 is so laid out that when the feed arm has correctly positioned the package on the scale pan, the finger then in engagement with the package is slightly withdrawn, so that it will not thereafter contact with or displace the package as the arm continues to revolve. An examination of the feeding device as illustrated in Fig. 4 will make this clear. The packages are brought to the feeding device in regular succession and in timed relation with the revolutions of the feed arm, so that the fingers thereon will not descend upon and so crush the packages. After the weighing operation has been completed, the weighed package, if it has not been ejected from the weighing machine because of under or over weight, is again pushed onto the conveyer belt 25 by the action of the feeding device in placing the next successive package upon the scale pan.

The weighing mechanism of the improved weighing machine comprises a main scale, generally indicated by the reference character 32, of which the beam 33 is provided with knife edges 34 (Figs. 2 and 8) adapted to fulcrum or pivot in corresponding V-shaped blocks 35 (Fig. 10) received in the upper end of a fulcrum stand 36 rising from the table 37 supported by the frame work or standard 38. The main scale 32, as well as the other parts of the weighing mechanism and the parts of the ejecting mechanism, is inclosed in a housing 39. Access is had to the interior of the housing through slide doors 40. Through a slot in the front end of this housing 39, the short or front end of the scale beam 33 projects, and on the extremity of this short end of the scale beam is provided the scale pan 41, upon which the packages 19 rest during the weighing operation. The rear or long end of the scale beam 33 is entirely within the housing 39 and is provided with a counter weight 42 so placed on the scale beam with respect to the fulcrum of the scale as to approximately determine the weight of the contents of the package on the scale pan. For finer weight adjustments, the counter weight 42 is provided with a screw 43, which is furnished with auxiliary counter weights 44 in the form of check nuts.

When the weight of a package properly positioned on the scale pan 41 has been determined and the feeding device operates to push another package on to the scale pan, thereby removing the weighed package, and until the unweighed package is correctly positioned on the scale pan, the main scale is held in neutral position by means of a neutralizer 46, which is in the shape of a V and adapted to receive between its arms a pin 47 (Figs. 3 and 8) projecting laterally from the rear end of the scale beam 33. The neutralizer 46 is moved into and out of its main scale neutralizing position at the requisite times by means of a cam 48 fixed on the cam shaft 14. The cam surface on the face of the cam 48 is engaged by a cam pin 49 on a lever 50 pivoted at 51 on a bracket 52 secured to the side of the housing 39. A spring 54 serves to draw the cam pin 49 toward the active face of the cam 48. The free end of the lever 50 is articulated by a pin and slot connection with a rod 56, to the bent end 57 of which the neutralizer 46 is secured. The rod 56 slides in brackets 58 secured to the side of the housing 39, as shown in Figs. 3 and 7. When the unweighed package has been properly positioned on the scale pan, the cam 48 acts to move the rod 56 longitudinally so as to disengage the neutralizer 46 from the pin 47 to permit the main scale to function.

In order to eliminate as much as possible any rebound after the weighing operations and to somewhat stabilize the motions of the scale beam 33, the rear end of the latter is provided with a vertically arranged rod 60, on the lower end of which is fastened a diaphragm 61, which works in glycerin or a liquid of similar resistance contained in a dash pot 64 resting on the table 37.

The ejecting mechanism of the improved weighing machine for ejecting from the machine under-weight packages and such overweight packages as are more than a predetermined amount over the standard weight, comprises ejectors 64 secured to the lower end of a lever 65 pivoted at 66 on a bracket 67 secured to the inner side of the upper portion of the housing 39. The ejectors 64 project through a slot 68 cut in the front of the housing. In the illustrated embodiment of the invention, the ejectors 64 are shown as so positioned that when they are moved into contact with a package to be ejected from the machine, they will knock the package off the scale pan 41, so that its contents will spill out. The ejectors are shown thus arranged because the weighing machine of the preferred embodiment of the invention is in practice employed in weighing packages of soap powder. And it has been found desirable, instead of carefully shoving the package to be ejected from the machine on to a receiving shelf or platform, so as not to disturb its contents, to so eject the package that its contents will spill out, after which the commodity is again placed in the hopper of the filling machine and the empty packages are automatically refilled. It will be understood, of course, that the invention is not to be restricted to the illustrated manner of ejecting the packages from the machine.

The devices for operating the ejectors 64 are actuated by a magnet 70, fastened to the roof of the housing 39. The magnet is energized when the contact points 71 and 72, secured to an arm 73 projecting laterally from the lower end of a rod 74 depending from the rear end of the scale beam 33, contact with the terminals 75 and 76. When the magnet is energized, it serves to draw toward itself the armature 78, which is connected by means of a link 79 with the lever 65. The energization of the magnet 70 thus serves to bring the ejectors 64 sharply and suddenly into contact with a package to knock it off the scale pan 41 into a receptacle provided for the purpose. When the magnet is deënergized by the breaking of the contact between the contact points 71 and 72 and the terminals 75 and 76, a spring 80 acts to return the armature 78 into its inoperative position.

When a package under the standard weight as determined by the position of the counter weight 42 on the scale beam 33 is on the scale pan 41 and the neutralizer 46 has been released from the pin 47, the counter weight 42 will, of course, act to depress the rear end of the scale beam 33 so as to bring the contact point 72 into contact with the terminal 75, thereby closing the magnet circuit which is shown diagrammatically in Fig. 11, with the result that the underweight package is ejected from the machine. In order that there may be no action of the ejecting mechanism except at the requisite times, a make-and-break device, generally indicated by the reference character 82 (Fig. 5) is placed in the circuit and is controlled by a cam 83 mounted on the cam shaft 14. The active part of the cam 83 is so arranged that it moves into contact with the two end wires of the make-and-break device 82 when a package has been properly positioned on the scale pan. The construction and mode of operation of this make-and-break device 82 is well known and therefore needs no further description. It will be observed in connection with the magnet circuit that, inasmuch as the scale beam 33 serves as part of the circuit, the fulcrum blocks 35 are insulated from the fulcrum stand 36, as shown in the end elevation in Fig. 10.

When a package on the scale pan is of such weight as to more than counter balance the counter weight 42, the front end of the scale beam 33 will, of course, be depressed and the rear end thereof will rise, moving the contact point 71 toward the terminal 76. Immediately the rear end of the scale beam 33 begins to move upward from its neutral position, it encounters a pin 85 depending from a longitudinally disposed scale beam 86, which forms part of a secondary or auxiliary scale 87 fulcrumed coincidentally with the main scale 32 in the fulcrum blocks 35, as shown most clearly in Fig. 2. The auxiliary scale is made yoke-shaped, as shown in Fig. 9, in order that it may conveniently straddle the scale beam of the main scale. In order to eliminate friction between the two scales, pins 88 rise from the top of the fulcrum stand 36, as shown in the front elevation in Fig. 10 and in Fig. 2. The auxiliary scale remains ineffective or inoperative while a standard-weight package or an under-weight package is on the scale pan, and for this purpose a rod 89 rising from the table 37 is provided with a right-angled rest 90 so positioned as to be under the rear end of the scale beam 86 of the auxiliary scale 87. This arrangement of parts is such that, when the rear end of the scale beam of the main scale descends by reason of the fact that an under-weight package is on the scale pan or when the scale beam 33 remains in neutral position by reason of the fact that a standard-weight package is on the scale pan, the scale beam 86 of the auxiliary scale 87 by engagement with the rest 90 cannot depress the scale beam 33. It is thus seen that the auxiliary scale plays no part in determining the weight of standard or under-weight packages. When, however, a package heavier than the standard weight as determined by the counter weight 42 on the scale beam 33 is on the scale pan, thereby depressing the forward end of the scale beam 33 and lifting the rear end, the top side of the main scale beam 33 is brought into engagement with the pin 85 depending from the auxiliary scale beam 86, and so tends to pivot the auxiliary scale 87 on its fulcrum. It is thus seen that when an over-weight package is on the scale pan, the auxiliary scale is brought into operation. The weight factor of the auxiliary scale is determined by moving the counter weight 82 along the scale beam 86. If it is predetermined that a package shall contain an excess of commodity amounting to more than one-eighth of an ounce over the standard weight before it will be ejected from the machine, the counter weight 92 of the auxiliary scale will be set accordingly, and if the weight of the package on the scale pan is over standard weight but does not amount to one-eighth of an ounce over standard weight, the auxiliary scale, through its pin 85, will prevent the main scale beam 33 from rising far enough to bring the contact point 71 into contact with the terminal 76 to close the magnet circuit. If the weight of the package on the scale pan is more than one-eighth of an ounce over the standard weight, the package will, of course, more than counter balance both the counter weights 42 and 92, so that the rear end of the scale beam 33 will rise and a contact will be made between the contact point 71 and the terminal 76, thereby closing the magnet circuit and effecting a movement of the ejectors 64 to knock the over-weight package from the scale pan. It will be readily understood that by adjusting the counter weight 92 of the auxiliary scale, any predetermined excess of commodity over standard weight may be permitted without an ejection of the packages from the machine. Before they will be ejected from the machine, their weight must be more than the predetermined excess (as determined by the position of the counter weight 92) over the standard weight as determined by the position of the counter weight 42. The amount of this excess over weight the packages are permitted to have before they will be ejected from the machine will depend on business considerations, and may be varied at any time if so desired.

The mode of operation of the improved weighing machine of the present invention has been set forth in connection with the description of the specific embodiment of the invention. It will be understood, therefore, without further explanation that when a package under the standard weight is on the scale pan, the rear end of the scale beam 33 will descend and cause the contact point 72 to contact with the terminal 75, thereby closing the magnet circuit to effect an actuation of the ejecting mechanism so as to knock the underweight package from the scale pan. In like manner, when a package of more than a predetermined amount over the standard weight is on the scale pan, it will over balance the counter weights on both the main scale beam and the auxiliary scale beam, thereby permitting the contact point 71 to strike the terminal 76 to close the magnet circuit; whereupon the actuation of the ejecting mechanism will knock the over-weight package from the scale pan.

The great desideratum in these supplementary weighing machines is to have them operate at as great a speed as possible and yet function accurately. By reason of the construction and arrangement of the parts of the improved supplementary weighing machine of the present invention, it has been found in actual practice that between forty and fifty packages can be weighed per minute. This speed of operation is attainable by reason of the fact that after the weighing of each package the main scale beam is instantly returned to neutral position; and immediately an unweighed package is placed upon the scale pan the main scale beam is again freed to perform its function. It is thus seen that the supplementary weighing machine of the present invention can easily handle and accurately re-weigh packages passing from automatic filling machines functioning at the rate of thirty to thirty-five per minute, and even more.

It will be understood that the weighing machine of the present invention is not limited to embodiment in the form shown in the illustrated embodiment thereof, but that the true scope of the invention is set forth in the appended claims.

Having thus described the invention, what I claim is:—

1. A weighing machine having, in combination, weighing mechanism, including a main scale, for automatically weighing packages in succession, means for ejecting from the succession of packages such as are under or over standard weight, and an auxiliary scale constructed and arranged to act in conjunction with the main scale to prevent the ejection of over-weight packages from the machine unless they are more than a predetermined amount over weight.

2. A weighing machine having, in combination, a main scale, means for feeding packages to the main scale, and an auxiliary scale having its fulcrum on the same line with the fulcrum of the main scale and arranged to be inoperative while a package under standard weight is being weighed and to act in conjunction with the main scale while a package over standard weight is being weighed.

3. A weighing machine having, in combination, a main scale, an auxiliary scale, a single pan for both scales, means for feeding packages in succession onto the pan, and means controlled by the main scale for ejecting from the machine packages under and over a standard weight, said auxiliary scale being inoperative when an under-weight package is on the pan and acting in conjunction with the main scale when an over-weight package is on the pan to prevent the ejection package from the machine of over-weight packages unless they are more than a predetermined amount over standard weight.

4. A weighing machine having, in combination, a main scale provided with a pan, means for feeding packages onto the pan, means for holding the main scale in neutral position until a package is properly positioned on the pan, package-ejecting means controlled by the main scale, and an auxiliary scale mounted to be affected by and act in conjunction with the main scale when the latter has been over balanced by a package of more than a standard weight.

5. A weighing machine having, in combination, means for automatically weighing packages, means for ejecting from the machine such packages as are over or under a standard weight, and means for preventing the ejection of over-weight packages from the machine unless they are more than a predetermined amount over the standard weight.

6. A weighing machine having, in combination, a main scale provided with a pan, means for placing packages successively on the pan, means for causing the scale to weigh the packages, means controlled by the scale for ejecting the packages from the machine if they are under or over standard weight, and an auxiliary scale to prevent the ejection of over-weight packages from the machine unless they are more than a predetermined amount over standard weight.

7. A weighing machine having, in combination, weighing mechanism, including a main scale and an auxiliary scale, said scales being provided with a single pan between them for weighing packages in succession, and an ejecting mechanism controlled by the weighing mechanism for ejecting from the machine packages which are under a standard weight and more than a predetermined amount over standard weight.

8. A weighing machine having, in combination, a main scale, provided with a pan, for weighing packages in succession, means for ejecting from the machine such packages as are under or over a standard weight, an auxiliary scale arranged to act in conjunction with the main scale only when an over-weight package is on the pan to prevent the ejection of over-weight packages from the machine unless they are more than a predetermined amount over the standard weight, and means connected with the auxiliary scale for determining the amount the packages shall be over-weight before they will be ejected from the weighing machine.

9. A weighing machine having, in combination, a main scale provided with a pan, means for feeding packages onto the pan in regular succession, means for holding the scale inoperative until a package is correctly positioned on the pan, means controlled by the main scale for knocking from the pan packages which are under or over a standard weight, and an auxiliary scale fulcrumed coincidentally with the main scale and arranged to act in conjunction with the main scale only when the latter has been over balanced by a package over standard weight.

10. A weighing machine having, in combination, weighing mechanism comprising a main scale and an auxiliary scale, and an ejecting mechanism controlled by the main scale for ejecting from the machine packages which are under and over a standard weight, said auxiliary scale being arranged to act in conjunction with the main scale only to prevent the ejection of over-weight packages from the machine unless they are more than a predetermined amount over the standard weight.

11. A weighing machine having, in combination, a main scale provided with a pan, means for placing packages successively on the pan, means for causing the scale to weigh the packages, means controlled by the scale for ejecting the packages from the machine if they are under or over standard weight, an auxiliary scale to prevent the ejection of over-weight packages from the machine unless they are more than a predetermined amount over standard weight, and means for varying the predetermined amount the packages shall be over weight.

12. A weighing machine having, in combination, weighing mechanism including a main scale for automatically weighing packages in succession, an auxiliary scale constructed and arranged to act in conjunction with the main scale to prevent the ejection of over-weight packages from the machine, unless they are more than a predetermined amount over-weight, and means thrown into operation by the movement of the main scale when a package of more than a predetermined amount over-weight is on the main scale.

13. A weighing machine having, in combination, a main scale, an auxiliary scale, a single pan for both scales, means for feeding packages in succession onto the pan, and a magnet-actuated means controlled by the movements of the main scale for ejecting from the machine packages under and over a standard weight, said auxiliary scale being inoperative when an under-weight package is on the pan and acting in conjunction with the main scale when an over-weight package is on the pan to prevent the ejection from the machine of such over-weight packages as are not more than a predetermined amount over standard weight.

14. A weighing machine having, in combination, means for automatically weighing packages, magnet-actuated means controlled by the package weighing means for ejecting from the machine such packages as are over or under a standard weight, and means for preventing the ejection of over-weight packages from the machine, unless they are more than a predetermined amount over standard weight.

15. A weighing machine having, in combination, a main scale provided with a pan, means for placing packages successively on the pan, means for causing the scale to weigh the packages, magnet-actuated means for ejecting such packages from the machine as are under or over standard weight, a magnet, a circuit in which the magnet is placed closed when the scale moves through a predetermined distance, and an auxiliary scale to prevent the ejection of over-weight packages from the machine, unless they are more than a predetermined amount over standard weight.

16. A weighing machine having, in combination, weighing mechanism, including a main scale and an auxiliary scale, said scales being provided with a single pan between them for weighing packages in succession, and an ejecting mechanism controlled by the weighing mechanism for ejecting from the machine packages which are under a standard weight and packages which are more than a predetermined amount over standard weight, said ejecting mechanism comprising an ejector for knocking the packages from the pan, and a magnet for actuating the ejector.

17. A weighing machine having, in combination, a main scale, means for feeding packages to the main scale, an auxiliary scale having its fulcrum on the same line with the fulcrum of the main scale and arranged to be inoperative while a package under standard weight is being weighed and to act in conjunction with the main scale while a package over standard weight is being weighed, and an ejecting mechanism controlled in its operations by the movements of the main scale for ejecting under-weight packages from the machine and such over-weight packages as are more than a predetermined amount over standard weight.

18. A weighing machine having, in combination, weighing mechanism comprising a main scale and an auxiliary scale, an ejecting mechanism comprising electro-magnetic means controlled by the movements of the main scale for ejecting from the machine packages which are under and over a standard weight, said auxiliary scale being arranged to act in conjunction with the main scale only to prevent the ejection of over-weight packages from the machine unless they are more than a predetermined amount over standard weight.

19. A weighing machine having, in combination, a main scale provided with a pan, ejecting mechanism for ejecting packages from the machine, said ejecting mechanism comprising an ejector, electro-magnetic means for actuating the ejector, a circuit in which the magnetic means is located, said circuit being closed by the movements of the main scale, and an auxiliary scale arranged to act in conjunction with the main scale to prevent the ejection from the machine of such over-weight packages as are not more than a predetermined amount over standard weight.

20. A weighing machine having, in combination, means for automatically weighing packages, means set in operation by the package weighing means for ejecting from the machine such packages as are over or under a standard weight, and means for preventing the ejection of over-weight packages from the machine unless they are more than a predetermined amount over standard weight.

J. ELMER HALLOCK.